United States Patent [19]

Ando

[11] 4,005,445
[45] Jan. 25, 1977

[54] AUTOMATIC EXPOSURE CONTROL MEANS

[75] Inventor: Kunio Ando, Warabi, Japan
[73] Assignee: Fuji Photo Optical Co., Ltd., Omiya, Japan
[22] Filed: Feb. 15, 1974
[21] Appl. No.: 442,755
[30] Foreign Application Priority Data
   Apr. 4, 1973 Japan .............................. 48-38580
[52] U.S. Cl. .................................. 354/44; 354/43; 354/60 R; 354/271; 352/141
[51] Int. Cl.$^2$ ............................................. G03B 7/08
[58] Field of Search ............. 354/44, 60, 270, 271, 354/43; 352/141

[56] References Cited
UNITED STATES PATENTS

| | | | |
|---|---|---|---|
| 3,554,633 | 1/1971 | Sekine | 352/141 |
| 3,587,420 | 6/1971 | Dop | 352/141 |
| 3,611,894 | 10/1971 | Minneste, Jr. | 354/44 X |
| 3,696,719 | 10/1972 | Tauikoski | 352/141 X |
| 3,776,111 | 12/1973 | Maido | 352/141 |
| 3,824,605 | 7/1974 | Fliesser et al., | 354/44 |

Primary Examiner—Russell E. Adams, Jr.

[57] ABSTRACT

A diaphragm of a camera is controlled by a servomotor which is actuated with an output of an amplifier. A bridge circuit including a photodetector which receives light from the object to be photographed is connected with the amplifier so that the imbalance output of the bridge circuit may be amplified by the amplifier and transmitted to the servomotor to actuate the motor in accordance with the imbalance of the bridge circuit. The output of the photodetector is differentiated by a differentiation circuit connected between the photodetector and the amplifier so that the output of the amplifier may be controlled by the differentiated output which represents the rate of variation in the quantity of light received by the photodetector.

5 Claims, 2 Drawing Figures

AUTOMATIC EXPOSURE CONTROL MEANS

BACKGROUND OF THE INVENTION

1. Field of the Invention

This invention relates to an automatic exposure control means, and more particularly to an automatic exposure control means for a photographic or cinematographic camera in which the diaphragm thereof is operated by a servomotor which is controlled by a photoelectric exposure measuring circuit to obtain a correct exposure.

2. Description of the Prior Art

It has heretofore been known in the art to control the exposure in a camera by controlling the diaphragm by use of a servomotor connected with a bridge circuit which includes a photodetector as one of the four resistors to be balanced. In such a control means, the imbalance output of the bridge circuit is amplified and used for operating the servomotor.

The above-described exposure control means using a servomotor is generally apt to cause a vibration around the balance point of the bridge circuit owing to the inertia of the motor, friction resistance in the movable mechanism and a large variation in the driving current.

Since the vibration as mentioned above is undesirable from the viewpoint of automatic exposure control, it has been proposed to connect a braking coil to the servomotor separately from the driving coil so that the revolution speed of the servomotor may be detected by the braking coil and the revolution of the servomotor may be braked thereby to eliminate said vibration of the servomotor.

The above-described exposure control means using a servomotor with a braking coil has defects in that the variation in the current flowing through the coil corresponding to the variation in the brightness of the object is mixed and detected with the variation in the revolution of the servomotor, and accordingly a particular type of servomotor having a built-in braking coil must be used.

SUMMARY OF THE INVENTION

In view of the above-described defects inherent in the conventional automatic exposure control means, the primary object of the present invention is to provide an automatic exposure control means in which a servomotor is stably operated without vibration to control the diaphragm of the camera.

Another object of the present invention is to provide an automatic exposure control means in which the information concerning the brightness of the object is effectively obtained independently of other factors.

Still another object of the present invention is to provide an automatic exposure control means for a camera using a servomotor in which no braking coil is necessitated in the servomotor.

In accordance with the present invention, the above objects are accomplished by means of a differentiation circuit connected with a photodetector for differentiating the output therefrom. The output of the photodetector is differentiated to obtain a signal which represents the rate of variation in the brightness of the object to be photographed and the differentiated signal is used to control the emitter current of a transistor amplifier which amplifies the imbalance output of the bridge circuit, whereby the servomotor driven by the transistor amplifier is braked to rotate with stable performance.

PREFERRED EMBODIMENT OF THE INVENTION

Figure 1:
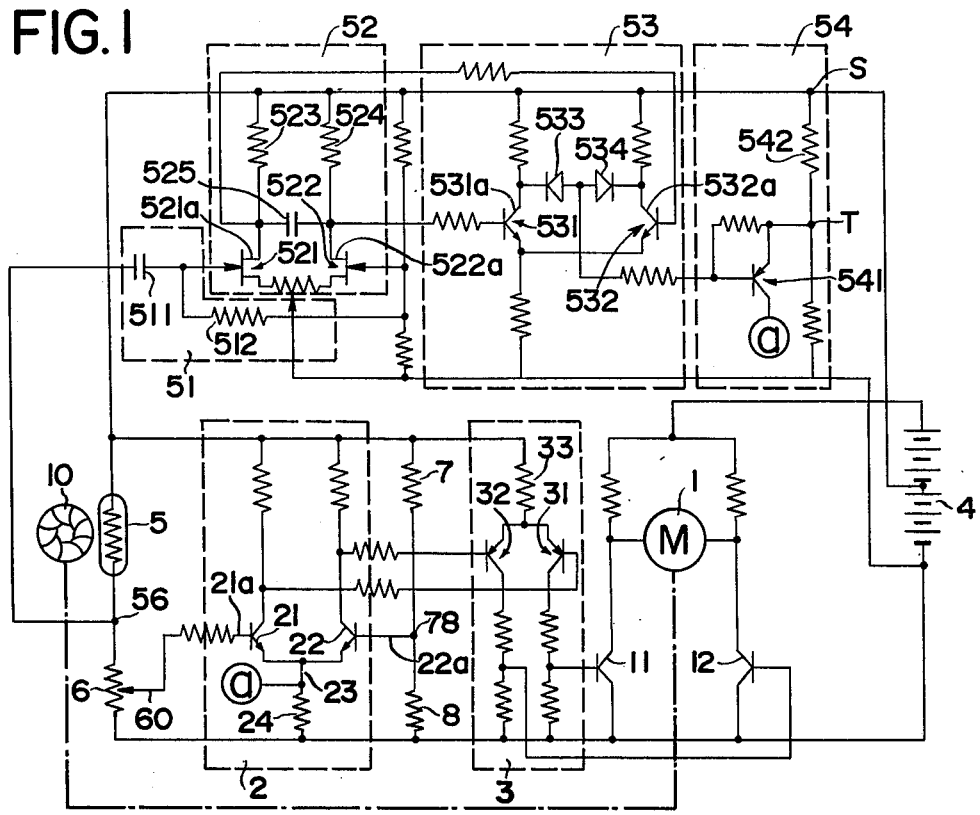
FIG. 1 shows an electric circuit which represents the automatic exposure control means in accordance with an embodiment of the invention.

Referring to FIG. 1 which shows an automatic exposure control means in accordance with an embodiment of the present invention in which a photoconductive type photodetector such as a cadmium sulfide element is used, a servomotor 1 associated with a diaphragm 10 of a camera is connected with output transistors 11 and 12 which are controlled by two differential amplifiers 2 and 3 comprising transistors 21 and 22, and 31 and 32, respectively. The output from the transistors 21 and 22 of the first differential amplifier 2 is put into the transistors 31 and 32 of the second differential amplifier 3. A photodetector 5 such as a cadmium sulfide element is provided to receive light from the object to be photographed. Although this embodiment employs a photoconductive type photodetector such as a cadmium sulfide element, it should be noted that a photovoltaic type photodetector such as a silicon blue cell can also be used. In case of a TTL (Through the Taking Lens) type camera in which the light, coming through the taking lens is measured, the element 5 receives light coming through said diaphragm 10. In case that the camera is not of the TTL type, the diaphragm 10 associated with the servomotor 1 is associated with a diaphragm located in front of the photodetector 5. The photodetector 5 is connected in series with a variable resistor 6. The variable resistor 6 is set to introduce into the circuit such factors necessary for determining the exposure as film sensitivity. The series circuit of the element 5 and the variable resistor 6 is connected across an electric source 4. A series circuit of two resistors 7 and 8 is also connected across the electric source 4. Further, the slide contact 60 of the variable resistor 6 is connected with the connecting point 78 of the two resistors 7 and 8 through said first differential amplifier 2 so that the imbalance current of the bridge circuit may be taken out as an input of the first differential amplifier 2. In detail, the slide contact 60 of the variable resistor 6 is connected with the input terminal 21a of the transistor 21 and the connecting point 78 between the resistors 7 and 8 is connected with the input terminal 22a of the transistor 22 of the first differential amplifier 2. Thus, a bridge circuit is constituted by the photodetector 5, the variable resistor 6 and the two resistors 7 and 8, and the imbalance output of the bridge circuit is amplified by the first differential amplifier 2. The output of the first differential amplifier 2 is further amplified by the second differential amplifier 3. The output of the second differential amplifier 3 is used to actuate the servomotor 1 by way of said output transistors 11 and 12, and the diaphragm 10 of the camera is controlled thereby.

On the other hand, the output of the photodetector 5 is put into a servomotor braking means comprising a differentiation circuit 51, a differential amplifier 52, a signal control means 53 for obtaining a negative output signal to brake the servomotor 1, and an amplifier 54 to put the negative signal into said first differential amplifier 2. The differentiation circuit 51 comprising a capacitor 511 and a resistor 512 is connected with the connecting point 56 of said photodetector 5 and said variable resistor 6 so that the output of the photodetector 5 may be differentiated thereby. The differentiated output of the differentiation circuit 51 is put into said differential amplifier 52 comprising two field effect transistors 521 and 522, two resistors 523 and 524 connected with the drains 521a and 522a of the field effect transistors 521 and 522 respectively and a capacitor 525 connected between the drains 521a and 522a. A signal which represents the rate of change in the output of the photodetector 5 is obtained by said differentiation circuit 51 and amplified by the differential amplifier 52. The capacitor 525 is used for eliminating high frequency noise. Since the rate of change in the output of the photodetector 5 is sometimes positive and sometimes negative depending on whether the quantity of light received by the photodetector 5 increases or decreases, the output signal which represents the negative or positive rate of change is converted into a constantly negative signal by the signal control means 53 comprising transistors 531 and 532 and diodes 533 and 534. Two outputs of opposite phase of the differential amplifier 52 taken at the drains 521a and 522a of the field effect transistors 521 and 522 are amplified by the transistors 532 and 531, respectively, and detected by the diodes 534 and 533 and taken out as a negative output. The negative output of the signal control means 53 is amplified by a transistor 541 of the amplifier 54 and transmitted to the emitter 23 of the first differential amplifier 2. Thus, the emitter current of the first differential amplifier 2 is controlled by the negative output from the amplifier 54 which represents the rate of change in the output of the photodetector 5, that is, the rate of change in the illumination of the object to be photographed. Consequently, the servomotor 1 is braked by the output which represents the rate of change in the illumination of the object and accordingly the servomotor is operated with improved stability without a vibration around the balance point of the bridge circuit.

Now the operation of the above-described circuit will be described in further detail with reference to FIGS. 1 and 2. When the photocurrent of the photodetector 5 increases, the current flowing through the field effect transistor 521 and the resistor 523 increases and the potential at the drain 521a falls and the potential at the drain 522a rises. Therefore, the current flowing through the transistor 531 increases and the current flowing through the transistor 532 decreases, and accordingly the potential at the collector 531a falls and the potential at the collector 532a rises. It will be understood that the operation of the circuit will be reversed when the photocurrent of the photodetector 5 decreases.

Figure 2:
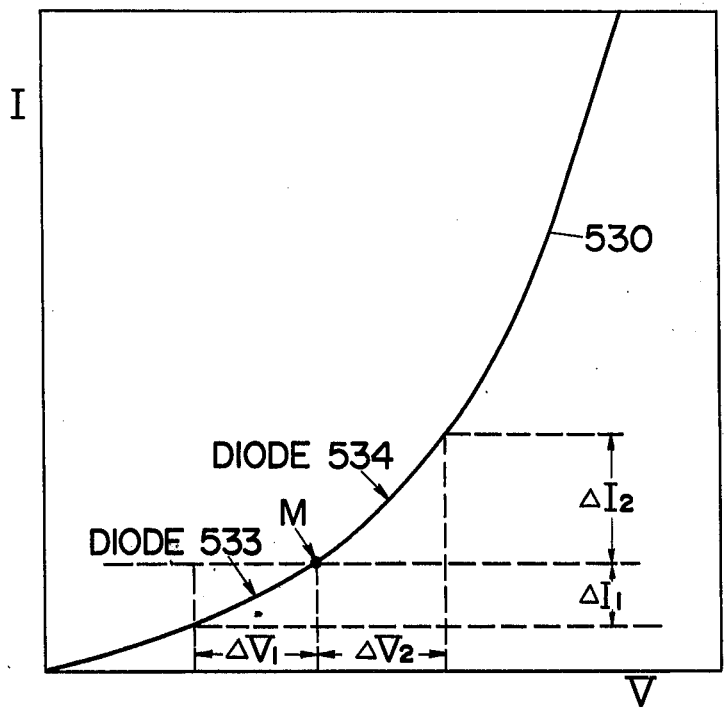
FIG. 2 is a graphical representation showing the charactaristics of diodes employed in the circuit shown in FIG. 1.

As shown in the graph of FIG. 2, the potential of points S and T across the resistor 542 connected with the emitter of the transistor 541 is so determined that the operating point may be on the curved portion M of the characteristic curve 530 of the diodes 533 and 534. Therefore, the amount of change $\Delta I_2$ of the current flowing through the diode 534 becomes larger than the amount of change $\Delta I_1$ of the current flowing through the diode 533 when the current flowing through the transistor 531 increases in comparison with the current flowing through the transistor 532. By the difference between the two amounts of change $\Delta I_2 - \Delta I_1$ in the current flowing through the diodes 533 and 534, the transistor 541 is energized to increase the collector current thereof. By the increase of the collector current of the transistor 541, the potential across the resistor 24 connected with the emitter 23 of the first differential amplifier 2 is raised and the emitter current of the first differential amplifier 2 is controlled thereby. Thus, the gain of the differential amplifier 2 is lowered to brake the servomotor 1. It will be understood that the output of the transistor 541 of the amplifier 54 can be transmitted to the emitter 33 of the second differential amplifier 3 to perform the same braking effect on the servomotor 1, if the output of the transistor 541 is reversed.

It will be understood that the degree of braking of the servomotor 1 can be changed to perform the optimum braking operation with respect to the mechanism of the diaphragm by changing the time constant of the differentiation circuit 51 determined by the capacity of the capacitor 511 and the resistance of the resistor 512.

I claim:

1. In an automatic exposure control means for a camera wherein a diaphragm of the camera is controlled by a servomotor which is actuated with an imbalance output of a bridge circuit including aa an element thereof a photodetector to receive light from the object to be photographed, said imbalance output of the bridge circuit being amplified by a transistor amplifier, the improvement comprising a servomotor braking means including a differentiation circuit connected to said photodetector and differentiating the output of said photodetector and an amplifier connected between said differentiation circuit and said transistor amplifier for putting the output of the differentiation circuit into said transistor amplifier to control emitter current thereof.

2. An automatic exposure control means for a camera as defined in claim 1 wherein said servomotor braking means includes a signal control means connected between said differentiation circuit and said amplifier for reversing the output of said differentiation circuit.

3. An automatic exposure control means for a camera as defined in claim 2 wherein said transistor amplifier is a differential amplifier constituted by a pair of transistors and said signal control means is connected with the emitter of said differential amplifier.

4. An automatic exposure conrol means for a camera defined in claim 3 wherein said differentiation circuit comprises a capacitor and a resistor and the differentiated output of said differentiation circuit is put into a differential amplifier having two field effect transistors and the output of said differential amplifier is put into said signal control means.

5. An automatic exposure control means for a camera as defined in claim 4 wherein one side of said capacitor is connected to one side of said photodetector and the other side of said capacitor is connected to the input of one field effect transistor and to one side of said resistor, and the other side of said resistor is connected to the input of the other field effect transistor.

* * * * *